US012638896B2

(12) United States Patent
Wang et al.

(10) Patent No.: US 12,638,896 B2
(45) Date of Patent: May 26, 2026

(54) COMPUTER DEVICE

(71) Applicant: ASUSTEK COMPUTER INC., Taipei (TW)

(72) Inventors: Kuo-Yi Wang, Taipei (TW); Cheng-Lun Tsai, Taipei (TW); Yi-Wei Chen, Taipei (TW); Yu-Yao Chen, Taipei (TW); Chun-Yu Chen, Taipei (TW); Shiou-Shian Mei, Taipei (TW); Yu-Chi Tu, Taipei (TW); Xiao-En Lin, Taipei (TW); Jung-Pin Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 141 days.

(21) Appl. No.: 18/796,788

(22) Filed: Aug. 7, 2024

(65) Prior Publication Data

US 2025/0348123 A1    Nov. 13, 2025

(30) Foreign Application Priority Data

May 9, 2024    (TW) ................................. 113117198

(51) Int. Cl.
*G06F 1/00* (2006.01)
*G06F 1/28* (2006.01)
*G06F 11/30* (2006.01)

(52) U.S. Cl.
CPC ..................................... *G06F 1/28* (2013.01)

(58) Field of Classification Search
CPC ........................................................ G06F 1/28
See application file for complete search history.

(56) References Cited

U.S. PATENT DOCUMENTS

| 2012/0019063 A1* | 1/2012 | Wang | G06F 1/3206 |
| | | | 307/18 |
| 2012/0187991 A1* | 7/2012 | Sathe | H03K 5/135 |
| | | | 327/158 |
| 2020/0103958 A1* | 4/2020 | Chen | G06F 1/3296 |
| 2024/0256022 A1* | 8/2024 | Yuan | G06F 1/3206 |
| 2025/0219531 A1* | 7/2025 | Chan | H02M 7/217 |

FOREIGN PATENT DOCUMENTS

| CN | 104571444 A | 4/2015 |
| CN | 216210909 U | 4/2022 |
| CN | 114661131 B | 8/2023 |

* cited by examiner

*Primary Examiner* — Mohammed H Rehman
(74) *Attorney, Agent, or Firm* — MUNCY, GEISSLER, OLDS & LOWE, P.C.

(57) ABSTRACT

A computer device provided includes an electronic system, a power supply unit, and a power control module. The electronic system includes a main board with a power connector and a central processing unit (CPU). The power supply unit is configured to supply power to the electronic system. The power control module includes a power specification detection unit, a system power consumption monitoring unit, and a power regulation unit. The power specification detection unit is electrically coupled to the power connector, and is configured to determine a rated power of the power supply unit. The system power consumption monitoring unit is electrically coupled to the power supply unit, and is configured to detect a system power consumption of the electronic system. The power regulation unit is electrically coupled to the CPU, and is configured to control a frequency of the CPU based on the system power consumption and the rated power.

10 Claims, 4 Drawing Sheets

COMPUTER DEVICE

CROSS-REFERENCE TO RELATED APPLICATION

This application claims the priority benefit of Taiwan Application Serial No. 113117198, filed on May 9, 2024. The entirety of the above-mentioned patent application is hereby incorporated by reference herein and made a part of specification.

BACKGROUND OF THE INVENTION

Field of the Invention

The disclosure relates to a computer device, and in particular, to a power control technology for a computer device.

Description of the Related Art

A central processing unit (CPU) is a main element of a computer device. To perform increasingly complex calculation and instruction operations, CPUs tend to pursue a higher core clock and a higher power density.

However, an instantaneous power consumption that comes with improved efficiency of CPUs often exceeds a bearing capability of a power supply unit. As a result, a protection mechanism of the power supply unit is easily triggered, causing system shutdown.

BRIEF SUMMARY OF THE INVENTION

The disclosure provides a computer device. The computer device includes an electronic system, a power supply unit, and a power control module. The electronic system includes a main board and a central processing unit (CPU). The main board includes a power connector. The power supply unit is configured to supply power to the electronic system through the power connector. The power control module includes a power specification detection unit, a system power consumption monitoring unit, and a power regulation unit. The power specification detection unit is electrically coupled to the power connector, and is configured to determine a rated power of the power supply unit through the power connector. The system power consumption monitoring unit is electrically coupled to the power supply unit, and is configured to detect a system power consumption of the electronic system. The power regulation unit is electrically coupled to the CPU, and is configured to control a frequency of the CPU based on the system power consumption and the rated power.

In the computer device provided in the disclosure, the power control module determines the rated power of the power supply unit through the power connector on the main board. In combination with the detected system power consumption, the frequency of the CPU is dynamically controlled, to avoid a problem of sudden shutdown of the computer device as a result of an excessive instantaneous power consumption of the CPU triggering the power supply unit to enter a protection state.

DETAILED DESCRIPTION OF THE EMBODIMENTS

Specific embodiments of the disclosure are described in more details below with reference to the schematic diagrams. Advantages and features of the disclosure become clearer based on the following descriptions and claims. It is to be noted that all figures are in a very simple form and in an inaccurate proportion, and are merely intended to assist in convenient and clear description of the embodiments of the disclosure.

Figure 1:
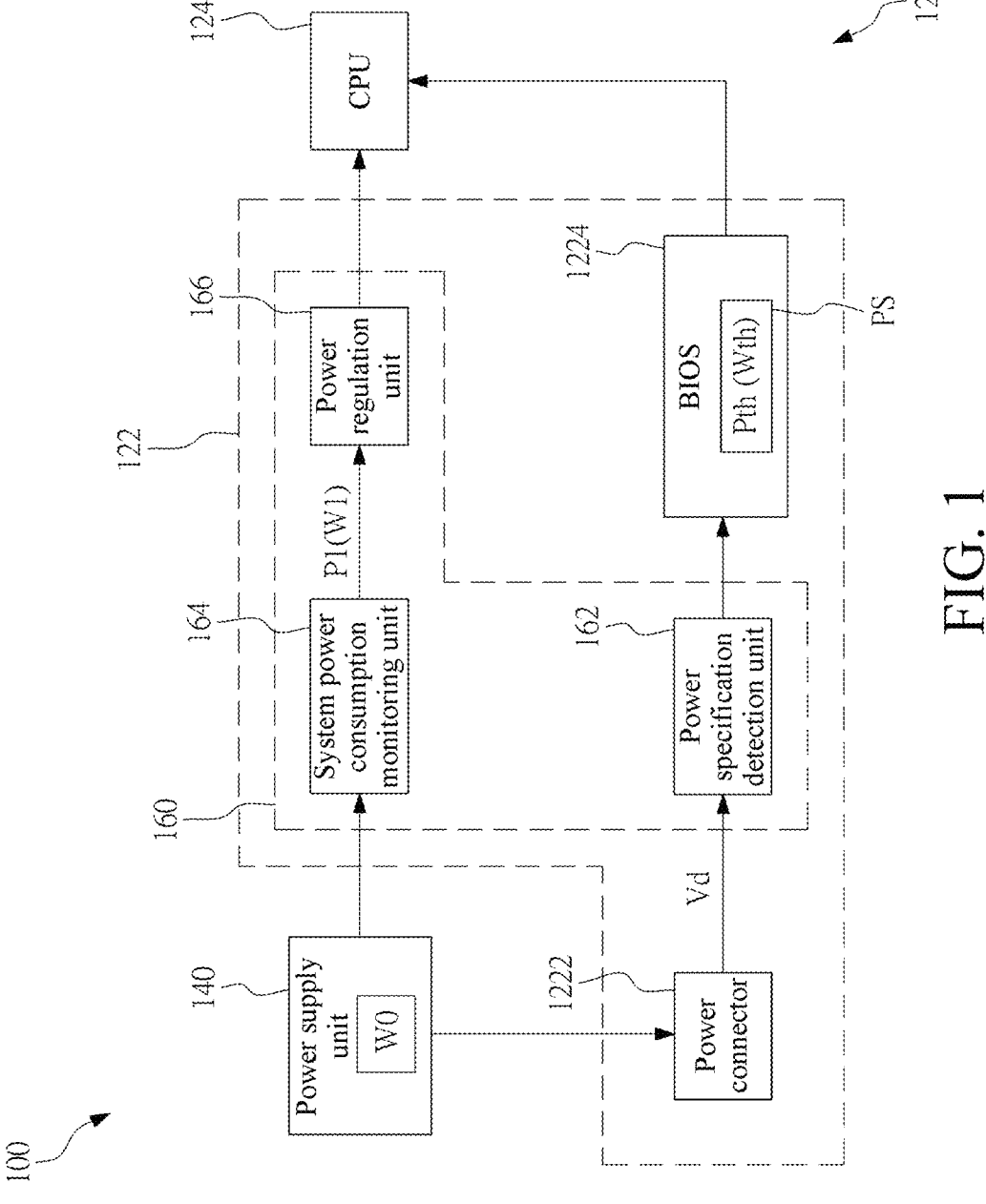
FIG. 1 is a schematic block diagram of a computer device according to an embodiment of the disclosure.

FIG. 1 is a schematic block diagram of a computer device 100 according to an embodiment of the disclosure. The computer device 100 is a desktop computer, a server, or another electronic device equipped with a main board and a power supply unit.

The disclosure provides a computer device 100. The computer device 100 includes an electronic system 120, a power supply unit 140, and a power control module 160.

The electronic system 120 includes a main board 122 and a central processing unit (CPU) 124. The main board 122 includes a power connector 1222 and a basic input/output system (BIOS) 1224. The CPU 124 is arranged on the main board 122. The power supply unit 140 is configured to supply power to the electronic system 120 through the power connector 1222.

In an embodiment, the electronic system 120 includes electronic modules such as a memory and a graphics card (not shown in the figure) based on an actual application need of the computer device 100. The electronic modules are connected to the main board 122 and operate in cooperation with the main board 122 and the CPU 124.

The power control module 160 is arranged on the main board 122, and is configured to control the supply of power by the power supply unit 140 to the electronic system 120.

As shown in the figure, the power control module 160 includes a power specification detection unit 162, a system power consumption monitoring unit 164, and a power regulation unit 166.

The power specification detection unit 162 is electrically coupled to the power connector 1222, and is configured to determine a rated power W0 of the power supply unit 140 through the power connector 1222. In an embodiment, the power specification detection unit 162 classifies the power supply unit 140 based on the determined rated power W0, and sets a different parameter set PS for the power supply unit 140 of a different category for control. In an embodiment, the power specification detection unit 162 is an embedded controller.

The system power consumption monitoring unit 164 is electrically coupled to the power supply unit 140, and is configured to monitor a system power consumption W1 of the electronic system 120, and generate a power consumption parameter P1 based on the system power consumption. In an embodiment, the system power consumption monitoring unit 164 includes a current shunt monitor (not shown in the figure) and a sensing resistor (not shown in the figure), to detect the system power consumption W1. Specifically, a system current supplied by the power supply unit 140 to the electronic system 120 flows through the sensing resistor, and the current shunt monitor captures a pressure difference on the sensing resistor and amplifies the pressure difference, to estimate the system power consumption W1 in real time.

Since a main power consumption source in the electronic system 120 is the CPU 124, in an embodiment, the system power consumption monitoring unit 164 detects a power consumption of the CPU 124 as the system power consumption W1 of the electronic system 120.

The power regulation unit 166 is electrically coupled to the CPU 124 and the system power consumption monitoring unit 164, and is configured to control a frequency of the CPU 124 based on the detected system power consumption W1 and the rated power W0 determined by the power specification detection unit 162.

In an embodiment, the main board 122 includes the BIOS 1224. The power specification detection unit 162 classifies the power supply unit 140 based on the determined rated power W0, and generates a parameter set PS corresponding to the classified category in the BIOS 1224 based on the category.

The parameter set PS includes a critical parameter Pth, and the critical parameter Pth corresponds to a critical power consumption Wth. The power regulation unit 166 determines a power consumption state of the electronic system 120 (particularly, the CPU 124) based on the critical parameter Pth and the power consumption parameter P1 from the system power consumption monitoring unit 164, to determine whether to reduce the frequency of the CPU 124.

When the power consumption parameter P1 monitored by the system power consumption monitoring unit 164 reaches the critical parameter Pth, that is, the system power consumption W1 reaches the critical power consumption Wth, the power regulation unit 166 reduces the frequency of the CPU 124. In an embodiment, when the system power consumption W1 reaches the critical power consumption Wth, the power regulation unit 166 reduces the frequency of the CPU 124 to a base frequency. In other words, the power regulation unit 166 compares the system power consumption W1 with the critical power consumption Wth, and selectively reduces the frequency of the CPU 124. Generally, the critical power consumption Wth set in the parameter set PS is less than the rated power W0 of the power supply unit 140, to avoid triggering the power supply unit 140 into a protection state.

In an embodiment, the parameter set PS generated by the power specification detection unit 162 further includes a plurality of power tracking parameters corresponding to power limits of different levels of the CPU 124 (in an embodiment, PL1, PL2, and the like defined by a CPU in Intel). Through the classification of the power supply unit 140 by the power specification detection unit 162, not only the critical power consumption Wth for the power regulation unit 166 to adjust the frequency of the CPU 124 is set, but also a power consumption for triggering power limiting of the CPU 124 is set.

Figure 2:
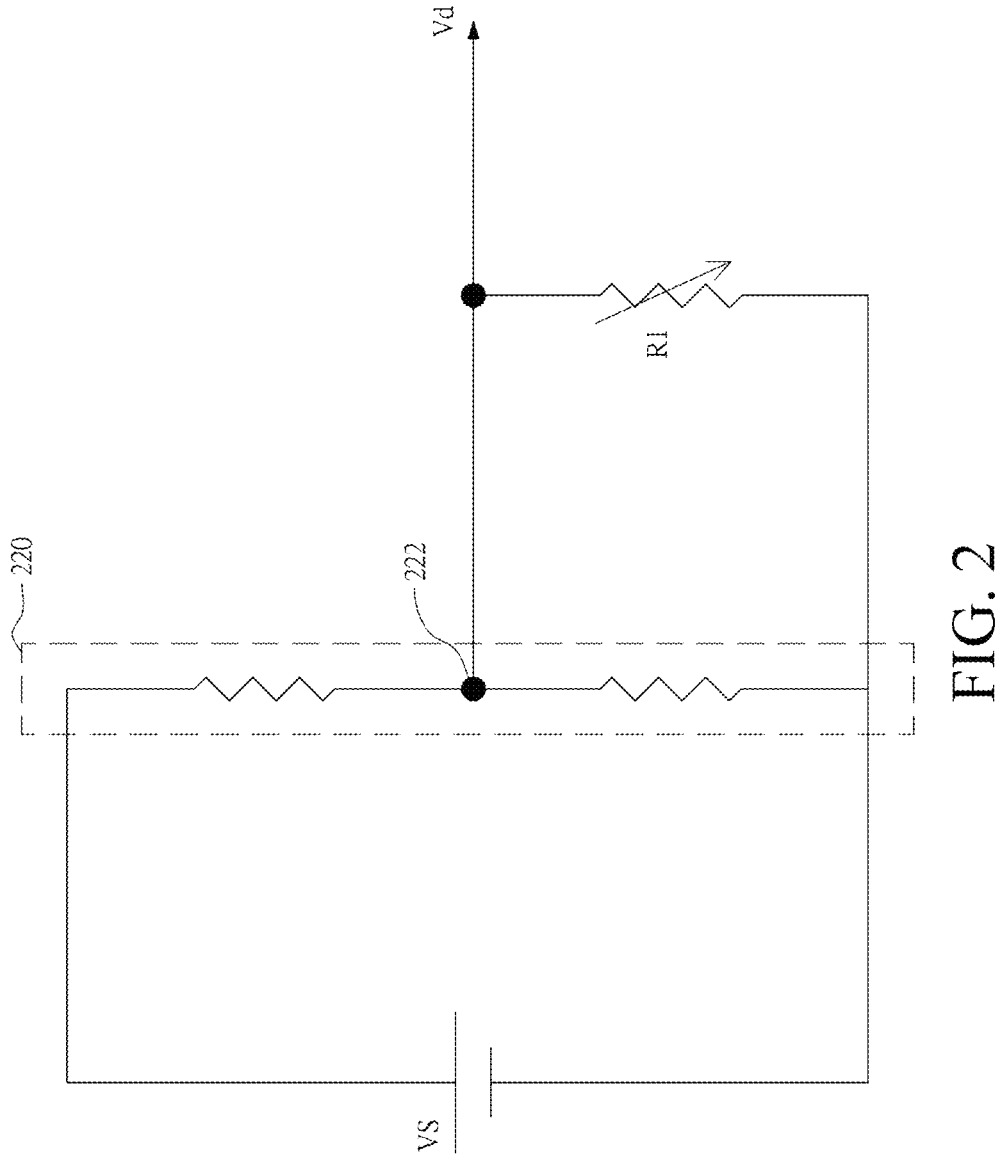
FIG. 2 shows an embodiment in which a power specification detection unit determines a rated power of a power supply unit through a power connector according to the disclosure.

FIG. 2 shows an embodiment in which the power specification detection unit 162 determines the rated power W0 of the power supply unit 140 through the power connector 1222 according to the disclosure.

As shown in the figure, the power supply unit 140 includes a first resistor R1, and a resistance value of the first resistor R1 corresponds to the rated power W0 of the power supply unit 140.

The power specification detection unit 162 includes a voltage divider circuit 220. Two ends of the voltage divider circuit 220 are electrically coupled to a voltage source VS, and a voltage divider output 222 of the voltage divider circuit 220 is configured to be electrically coupled to the first resistor R1 through the power connector 1222. The power specification detection unit 162 detects a detected voltage of the voltage divider output 222, to determine the rated power W0 of the power supply unit 140.

In an embodiment, first resistors R1 with different resistance values are arranged in the power supply unit 140 based on a specification of the power supply unit 140 for detection by the power control module 160 of the disclosure, to determine the specification of the power supply unit 140.

In an embodiment, for a power supply unit 140 with a rated power W0 of 180 W, the first resistor R1 has no connection, that is, in an open circuit state, and a resistance value thereof is an infinite value. For a power supply unit 140 with a rated power W0 of 300 W, a resistance value of the first resistor R1 is secondary to the infinite value, which is 249 K ohms. For a power supply unit 140 with a rated power W0 of 500 W, a resistance value of the first resistor R1 thereof is smallest, which is 100 K ohms.

Figure 3:
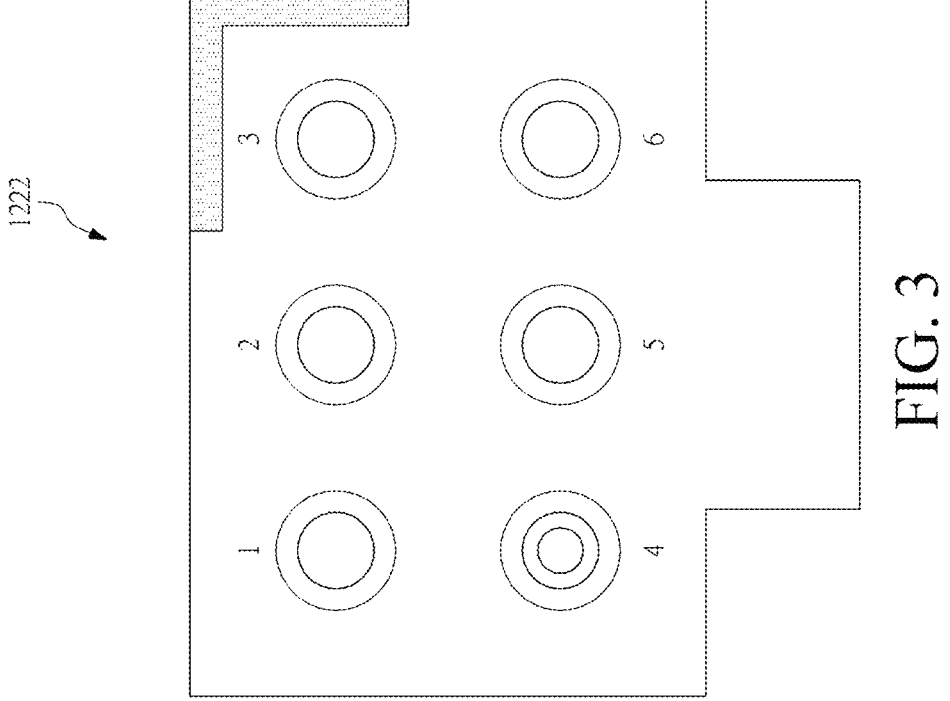
FIG. 3 shows an embodiment of a power connector according to the disclosure.

FIG. 3 shows an embodiment of the power connector 1222 according to the disclosure. A power connector 1222 with six pins is used as an example in the figure.

The power connector 1222 includes a total of six pins. The pins are numbered as 1 to 6. The pin numbered as 1 is configured to transmit a startup signal, the pins numbered as 2 to 3 are grounding pins, and the pins numbered as 5 to 6 are configured to transmit power. In this embodiment, the pin numbered as 4 is connected to the first resistor R1 in FIG. 2 in parallel for detection and determination by the power specification detection unit 162.

However, the disclosure is not limited thereto. Based on different actual applications, the disclosure is not limited to usage of the power connector 1222 with six pins, and the pin configured to connect to the first resistor R1 is also not limited to the pin numbered as 4. In an embodiment, the first resistor R1 is connected in parallel to any grounding pin of the power connector 1222.

Figure 4:
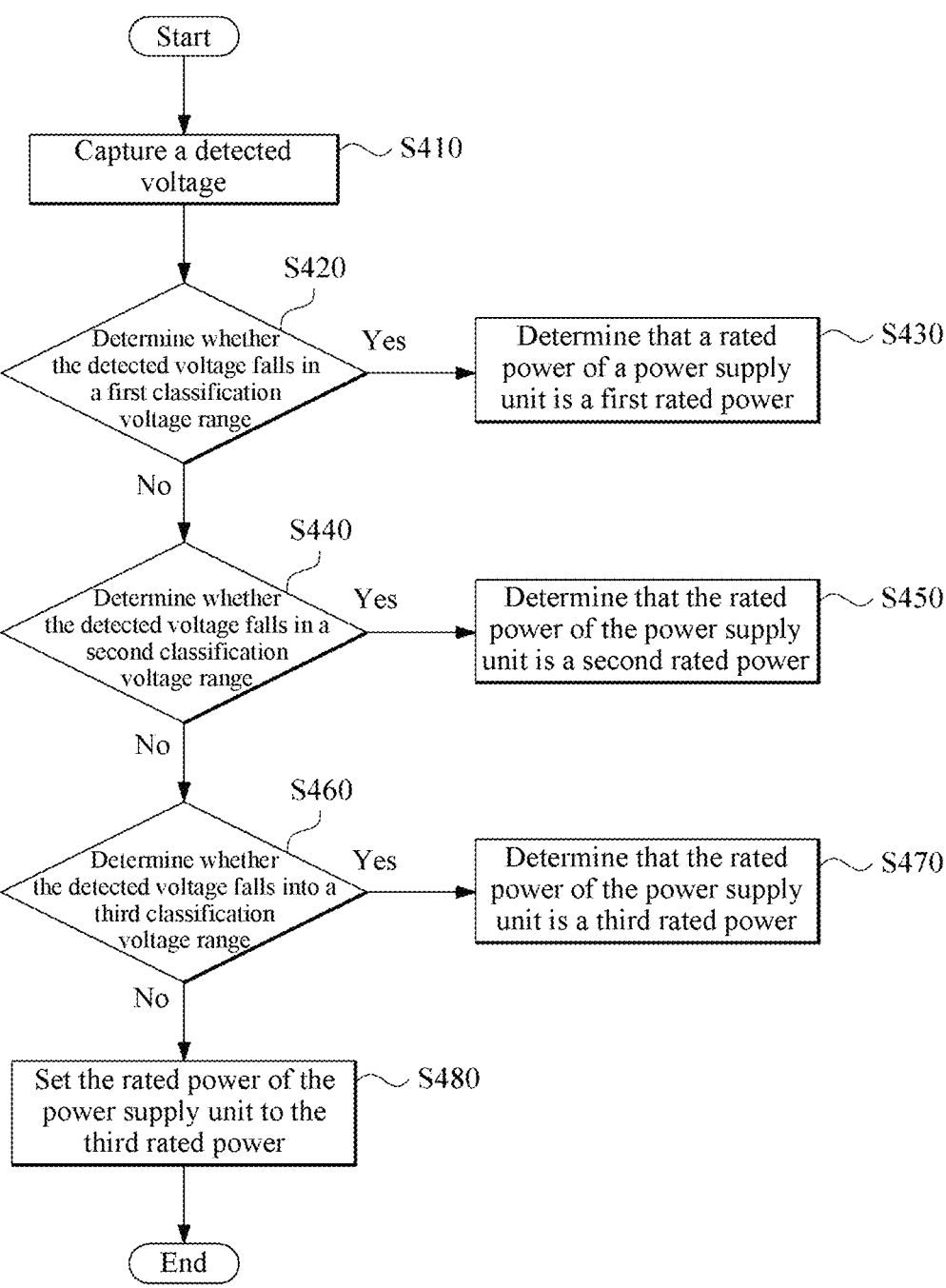
FIG. 4 shows a determination process in which a power specification detection unit determines a power category to which the power supply unit belongs according to the disclosure.

FIG. 4 shows a determination process in which the power specification detection unit 162 determines a power category to which the power supply unit 140 belongs according to the disclosure.

The determination process of this embodiment is applicable to a power specification detection unit 162 configured with a first classification voltage range, a second classification voltage range, and a third classification voltage range. A minimum voltage value in the first classification voltage range is greater than a maximum voltage value in the second classification voltage range, and a minimum voltage value in the second classification voltage range is greater than a maximum voltage value in the third classification voltage range. The first classification voltage range corresponds to a first rated power, the second classification voltage range corresponds to a second rated power, and the third classification voltage range corresponds to a third rated power. The first rated power is greater than the second rated power, and the second rated power is greater than the third rated power.

In an embodiment, the first classification voltage range is between 1.43 volts and 1.54 volts, the first rated power corresponding to the first classification voltage range is 500 W, the second classification voltage range is between 1.97 volts and 2.11 volts, the second rated power corresponding to the second classification voltage range is 300 W, the third classification voltage range is between 2.64 volts and 2.79 volts, and the third rated power corresponding to the third classification voltage range is 180 W.

After the determination process is started, as described in step S410, a detected voltage Vd of the voltage divider output 222 of the voltage divider circuit 220 is captured.

Subsequently, as described in step S420, it is determined whether the detected voltage Vd falls in the first classification voltage range. When the detected voltage Vd falls in the first classification voltage range, the process proceeds to step S430 of determining that the rated power W0 of the power supply unit 140 is the first rated power.

When the detected voltage Vd does not fall in the first classification voltage range, the process proceeds to the determination step S440 of determining whether the detected voltage Vd falls in the second classification voltage range. When the detected voltage Vd falls in the second classification voltage range, the process proceeds to step S450 of determining that the rated power W0 of the power supply unit 140 is the second rated power.

When the detected voltage Vd does not fall in the second classification voltage range, the process proceeds to the determination step S460 of determining whether the detected voltage Vd falls in the third classification voltage range. When the detected voltage Vd falls in the third classification voltage range, the process proceeds to step S470 of determining that the rated power W0 of the power supply unit 140 is the third rated power.

When the detected voltage Vd does not fall in the third classification voltage range, the process proceeds to step S480 of still setting the rated power W0 of the power supply unit 140 to the third rated power. In this way, the entire determination process is ended.

In the above embodiments, the three classification voltage ranges are set to define three different rated powers. However, the disclosure is not limited thereto. Two classification voltage ranges are set to define two different rated powers, or four or more classification voltage ranges are set to define more rated powers based on an actual need (in an embodiment, the rated power W0 of the power supply unit 140 in the market).

In summary, in the computer device 100 provided in the disclosure, the power control module 160 determines the rated power W0 of the power supply unit 140 through the power connector 1222 on the main board 122. In combination with the detected system power consumption W1, the frequency of the CPU 124 is dynamically controlled, to avoid a problem of sudden shutdown of the computer device 100 as a result of an excessive instantaneous power consumption of the CPU 124 triggering the power supply unit 140 to enter a protection state.

The above is merely preferred embodiments of the disclosure, and does not impose any limitation on the disclosure. Any form of change such as an equivalent replacement or modification made by any person skilled in the art to technical means and technical content disclosed in the disclosure without departing from scope of the technical means of the disclosure is content that does not deviate from the technical means of the disclosure, and still falls within protection scope of the disclosure.

What is claimed is:

1. A computer device, comprising:
an electronic system, comprising a main board and a central processing unit (CPU), wherein the main board comprises a power connector;
a power supply unit, configured to supply power to the electronic system through the power connector; and
a power control module, comprising:
a power specification detection unit, electrically coupled to the power connector and configured to determine a rated power of the power supply unit through the power connector;
a system power consumption monitoring unit, electrically coupled to the power supply unit and configured to detect a system power consumption of the electronic system; and
a power regulation unit, electrically coupled to the CPU and configured to control a frequency of the CPU based on the system power consumption and the rated power.

2. The computer device according to claim 1, wherein the main board comprises a basic input/output system (BIOS), and the power specification detection unit is configured to generate a parameter set corresponding to the rated power in the BIOS based on the determined rated power.

3. The computer device according to claim 2, wherein the parameter set comprises a critical parameter, and the critical parameter corresponds to a critical power consumption.

4. The computer device according to claim 3, wherein when the system power consumption reaches the critical power consumption, the power regulation unit reduces the frequency of the CPU.

5. The computer device according to claim 4, wherein when the system power consumption reaches the critical power consumption, the power regulation unit reduces the frequency of the CPU to a base frequency.

6. The computer device according to claim 1, wherein the power supply unit comprises a first resistor, and a resistance value of the first resistor corresponds to the rated power of the power supply unit.

7. The computer device according to claim 6, wherein the first resistor is electrically coupled to the power connector.

8. The computer device according to claim 6, wherein the power specification detection unit comprises a voltage divider circuit, two ends of the voltage divider circuit are electrically coupled to a voltage source, and a voltage divider output of the voltage divider circuit is configured to be electrically coupled to the first resistor through the power connector, and the power specification detection unit is configured to detect a detected voltage of the voltage divider output, to determine the rated power of the power supply unit.

9. The computer device according to claim 8, wherein the power specification detection unit is configured with a plurality of classification voltage ranges.

10. The computer device according to claim 9, wherein the power specification detection unit is configured to determine the rated power of the power supply unit based on the classification voltage range in which the detected voltage falling into.

* * * * *